United States Patent [19]

Kaminski

[11] Patent Number: 4,495,706

[45] Date of Patent: Jan. 29, 1985

[54] ALIGNMENT GAGE FOR DISH ANTENNA

[75] Inventor: Elton G. Kaminski, Sidney, Ohio

[73] Assignee: The Stolle Corporation, Sidney, Ohio

[21] Appl. No.: 399,307

[22] Filed: Jul. 19, 1982

[51] Int. Cl.³ .................. G01C 17/18; G01C 23/00
[52] U.S. Cl. ...................................... 33/333; 33/352; 343/894
[58] Field of Search .............. 33/180 R, 273, 333, 33/334, 343, 352, 370, 371, 391, 355; 343/720, 894

[56] References Cited

U.S. PATENT DOCUMENTS

| | | | |
|---|---|---|---|
| 51,675 | 12/1865 | Abbott | 33/273 |
| 377,396 | 2/1888 | Looker et al. | 33/273 |
| 420,242 | 1/1890 | Nielsen | 33/333 |
| 1,097,925 | 5/1914 | Johnson | 33/352 |
| 1,448,031 | 3/1923 | Morris | 33/352 |
| 3,591,925 | 7/1971 | Dupin | 33/391 |
| 3,862,500 | 1/1975 | Wibom | 33/352 |
| 4,126,865 | 11/1978 | Longhurst et al. | 343/894 |

FOREIGN PATENT DOCUMENTS

| | | | |
|---|---|---|---|
| 1231876 | 10/1960 | France | 33/391 |
| 214225 | 7/1941 | Switzerland | 33/355 |

Primary Examiner—Richard R. Stearns
Attorney, Agent, or Firm—Frost & Jacobs

[57] ABSTRACT

An alignment gage for accurately positioning the azimuth and elevation angles of a fixed receiving dish antenna. The alignment gage is mounted to the dish and includes a gravity actuated pendulum cooperating with an arcuate scale for setting the elevational angle. A magnetic compass having a graduated scale is used to set the azimuth angle of the antenna. In one embodiment, the compass surmounts the pendulum so as to remain in a horizontal position. The gage is particularly adapted for use by unskilled persons for use in installing home dish antennas.

9 Claims, 11 Drawing Figures

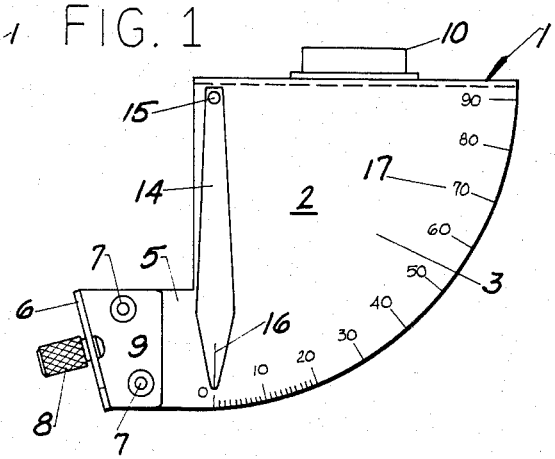
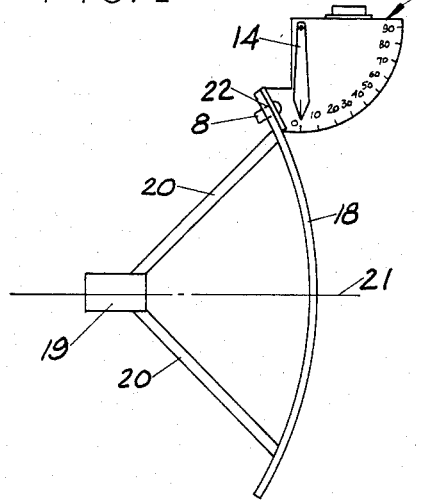
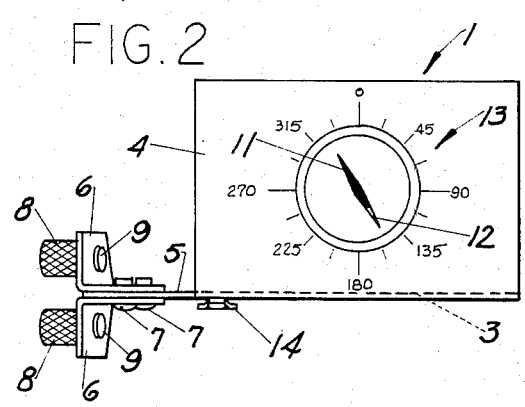
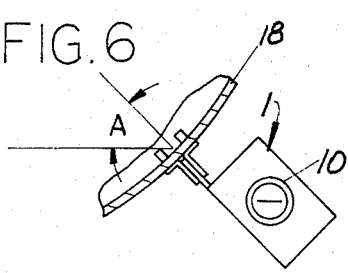
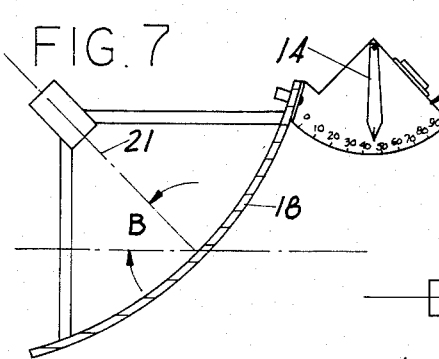
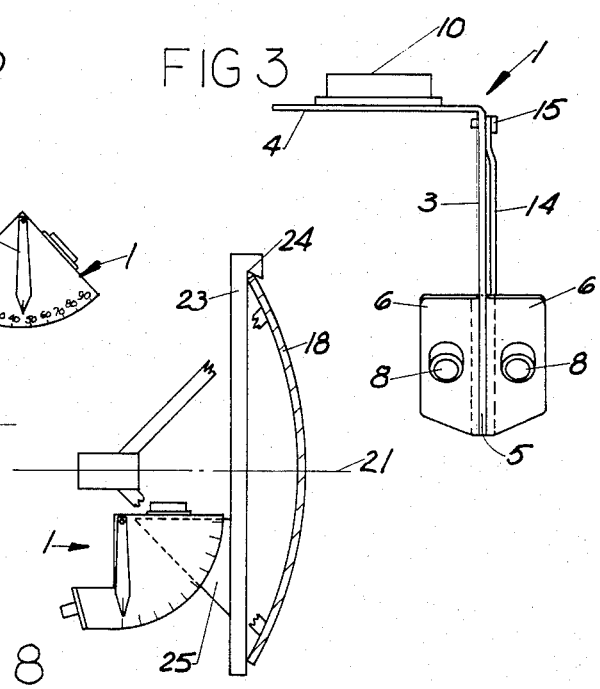

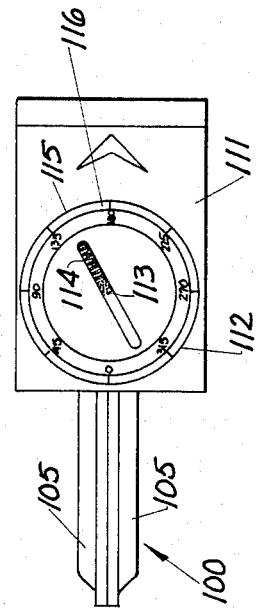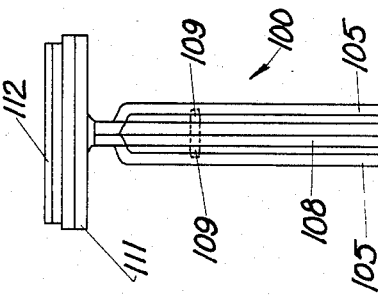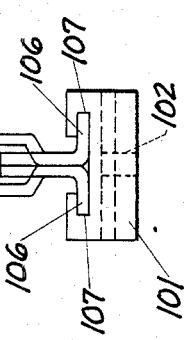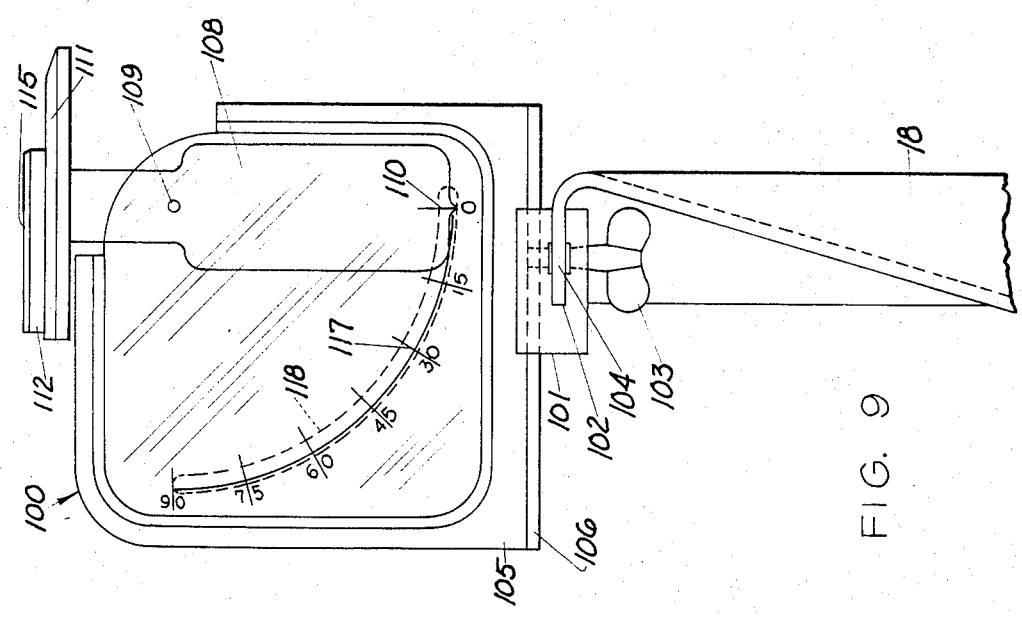

ALIGNMENT GAGE FOR DISH ANTENNA

SUMMARY OF THE INVENTION

A large number of space satellite transmitters are now in earth synchronous orbits and are being used for transmitting various types of signals to earth stations. Some of these satellites are dedicated to relaying multi-channel television transmissions beamed to the satellite from a ground station. Individual dish antennae located on the ground of fixed orientation are used to receive the relatively weak signals transmitted by the synchronous satellites for use in cable or other single or multi-user applications.

The availability of multi-channel transmissions such as the type described has resulted in fixed installation dish antennae being made available to homeowners or other individuals for private reception of the transmitted signals. Such antennae, which may be quite costly, are generally located on the user's roof or in an open area such as a yard near the residence. Initial installation of the dish antenna requires that the electrical boresight or pointing axis of the antenna be accurately aligned with the beam transmitted from the particular synchronous satellite of interest for optimum reception. Generally, alignment requires accurate azimuth and elevation positioning using sophisticated equipment, and is often provided by the seller of the antenna as part of the cost of installation. In many instances, the alignment procedure generally requires that the pointing axis of the antenna be directed toward the general vicinity of the transmitting synchronous satellite to capture the transmitted signal. Once a signal is being received, a signal strength meter or other electronic instrument can be used to "fine tune" the azimuth and elevation orientation of the antenna to maximize received signal strength.

It is anticipated that additional synchronous satellites of this type will be placed in orbit which will transmit more powerful signals to earth, thereby enabling the use of a smaller dish antenna. As this occurs, it will become more common for the purchaser of the dish antenna to perform the actual installation, including the final alignment of the antenna pointing axis. The present invention is directed to an alignment gage which can be used by an unskilled individual for aligning such a dish antenna. It is anticipated that the alignment gage may either be purchased by the user, or borrowed temporarily from the seller of the antenna and returned after the installation has been completed.

In a preferred embodiment, the alignment gage of the present invention includes means for visually measuring the elevational position of the pointing axis including means for measuring the angular deviation in the vertical plane from a true vertical axis. These means include a graduated angular scale consisting of a plurality of spaced indicia which is generally vertically disposed when the gage is mounted at a predetermined point on the antenna. A weighted pendulum is pivotally mounted to the gage and has indicia on one end which cooperate with the scale to display the vertical angular deviation. The upper end of the pendulum may be attached to a mounting bracket, part of which may be transparent or provided with a slot so that the indicating end of the pendulum is visible through the bracket from either or both sides of the gage. By positioning the gage at the proper point on the antenna dish or supporting framework for the antenna, the pointing axis may be set to a predetermined elevation angle corresponding to that necessary to intersect the transmitted beam from the synchronous satellite.

The gage is also provided with means for visually measuring the azimuthal position of the pointing axis and includes means for measuring the angular deviation in the horizontal plane for magnetic north. In a preferred embodiment, these means comprise a magnetic compass having a rotatably mounted partially magnetized movable indicator and a graduated angular scale surrounding the indicator. In one form of the invention, the compass may be fixedly attached to the mounting bracket. In another form of the invention, the compass is mounted to the upper end of the pendulum such that the movable indicator remains substantially horizontal with changes in inclination of the antenna. The azimutal position of the pointing axis of the antenna may be set by correlating the angle from magnetic north (which corresponds closely to true north in most areas of North America) with the known azimuthal position of the transmitted beam from the synchronous satellite.

Once the proper orientation of the pointing axis of the antenna dish has been determined, the gage may be easily detached from the antenna or its supporting structure and reused.

Further features of the invention will become apparent from the detailed description which follows.

BRIEF DESCRIPTION OF THE DRAWING

FIG. 1 is a side elevational view of a first embodiment of the alignment gage of the present invention.

FIG. 2 is a top plan view of a first embodiment of the alignment gage of the present invention.

FIG. 3 is an end elevation view of a first embodiment of the alignment gage of the present invention.

FIG. 4 is a side elevation view illustrating the alignment gage of FIG. 1–FIG. 3 attached to a dish antenna with the pointing axis horizontal.

FIG. 5 is a fragmentary top plan view of the alignment gage of FIG. 1–FIG. 3, attached to a dish antenna with the pointing axis pointing at the zero azimuth position.

FIG. 6 is a fragmentary top plan view of the alignment gage of FIG. 1–FIG. 3 with the antenna rotated in the horizontal plane to an azimuth angle A.

FIG. 7 is a side elevation view of the alignment gage of FIG. 1–FIG. 3 with the antenna elevated to an elevation angle B.

FIG. 8 is a fragmentary side elevation view of an alternate mounting configuration for the alignment gage of FIG. 1–FIG. 3.

FIG. 9 is a fragmentary side elevation view of a second embodiment of the alignment gage of the present invention.

FIG. 10 is a top plan view of the alignment gage of FIG. 9.

FIG. 11 is an end elevation view of the alignment gage of FIG. 9.

DETAILED DESCRIPTION

A first embodiment of the alignment gage of the present invention is illustrated generally at 1 in FIG. 1–FIG. 3. Gage 1 is formed by an L-shaped mounting bracket 2 having a vertical wedge-shaped plate 3 surmounted by a horizontally extending generally rectangular arm 4. The lower rear portion of plate 3 terminates in a tongue 5.

Attached to the tongue is means for temporarily and detachably mounting the gage to the dish antenna. In the embodiment illustrated, a pair of ears 6 flare outwardly from tongue 5, and may be attached thereto by rivets or the like 7. Each ear 6 mounts a thumb nut 8 having a threaded shaft 9 which may be used to mount the gage 1 to co-operating openings in the dish antenna as will be described in more detail hereinafter.

Gage 1 is also provided with means for visually measuring the azimuthal position of the pointing axis of the dish antenna. In the embodiment illustrated, these means measure the angular deviation in the horizontal plane from magnetic north by means of a magnetic compass, generally illustrated in 10, fixedly attached to the upper-most planar surface of arm 4 of the mounting bracket. Compass 10 includes a rotatably moveable indicator 11 having a magnatized tip 12. A graduated angular scale 13 surrounds the outer perimeter of compass 10 for providing a visual indication of azimuth position.

Gage 1 is further provided with means for visually measuring the elevational position of the pointing axis of the antenna by providing an indication of the angular deviation in the vertical plane from a true vertical axis. In the embodiment illustrated, this is provided by a vertically depending weighted pointer or pendulum 14 which is pivotally mounted at its upper end as at 15 to the upper edge of plate 3 of the mounting bracket. As can best be seen in FIG. 3, pendulum 14 is angled outwardly so as to swing free of the forward surface of plate 3. The lower end of pendulum 14 is provided with indicating means in the form of an inscribed line 16.

The forward surface of plate 3 is also provided with a graduated angular scale 17 comprising a plurality of equally spaced indicia spaced at equal distances from the pivot point 15 to designate angular position. As best shown in FIG. 1, it will be observed that as gage 1 is tilted, hanging pendulum 14 will remain stationary with inscribed line 16 cooperating with scale 17 to provide an indication of the degree of tilt or inclination of the gage.

The method of using the gage of the present invention is illustrated schematically in FIG. 4-FIG. 7 in connection with a parabolic dish antenna 18 having a receiving device 19 positioned at the focal point of the antenna and supported by supporting braces 20. The electrical boresight or pointing axis of antenna 18 is designated by line 21.

Initially, gage 1 is attached to the rear surface of dish antenna 18 by unscrewing thumbnuts 8 and re-attaching them to ears 6 so that the threaded shafts 9 of the thumbnuts pass through cooperating spaced threaded holes 22 in the upper edge of the dish. It will be understood that appertures 22 will be positioned on the antenna in accurate relationship with the pointing axis 21 so that the azimuth and elevation readings obtained from gage 1 accurately reflect the pointing direction of the antenna. It will be further understood that other means may be provided for attaching the gage to the structure, provided that the accurate relationship between the pointing axis and azimuth and elevation readings is maintained as described.

In FIG. 4 the antenna is shown with its pointing axis horizontal. Since the mounting arrangement of the gage positions the gage in true relationship with the antenna pointing axis, the pointed end of pendulum 14 may read zero degrees or less. This is of no concern since, when antenna 18 is adjusted upward in the vertical plane, pendulum 14 will accurately indicate the elevation setting of antenna 18. At the same time, as illustrated in FIG. 5, antenna 18 is rotated in the horizontal plane until indicator 11 of compass 10 points due north (zero degrees). This provides the azimuth reference position.

The antenna 18 may then be rotated in the horizontal plane until the angular position designated by compass 10 and scale 13 reads the desired azimuth angle A, corresponding to the known azimuth position of the particular synchronous satellite to be received by the antenna. The antenna may then be locked at this azimuth angle by conventional locking means, not shown.

As shown in FIG. 7, the antenna is then elevated until pendulum 14 reads the desired elevation angle B corresponding to the known elevation angle of the synchronous satellite. The antenna may then be locked at this elevation positon, and gage 1 removed from the structure.

An alternate method of mounting the gage to the antenna is illustrated in FIG. 8. Here, there is provided a hanger 23 having a notched upper end 24 configured to fit over the upper end of antenna 18 so that the hanger depends downwardly between the upper and lower edges of the antenna dish. A bracket 25 extends outwardly from hanger 23 and acts as a support or rest for the arm portion 4 of gage 1. As illustrated in FIG. 8, the upper end of rest 25 is horizontally disposed when pointing axis 21 is horizontal. Gage 1 may then be secured to rest 25 by any convenient means, and the orientation steps described herein may be used to align the antenna to the proper elevation and azmuthal positions.

A second embodiment of the alignment gage, designated generally at 100, is illustrated in FIG. 9-FIG. 11, where elements similar to those previously described have been similarily designated.

Gage 100 includes a lower channel-like mounting plate 101 having a threaded aperature 102 therein for accepting a thumb screw 103 or the like for mounting gage 100 to a cooperating aperture 104 in the upper edge of antenna dish 18 in a manner similar to that described hereinabove with respect to the embodiment of FIG. 1-FIG. 3.

A pair of spaced parallel plates 105 extend upwardly from mounting plate 101 and include outwardly extending feet portions 106 along their lower edges which are fixedly captured in cooperating slots 107 in the upper surface of mounting plate 101.

A paddle-shaped pendulum is vertically disposed between plates 105 and is pivotedly attached to each of them by pivot bearings 109. It will be observed that this arrangement permits pendulum 108 to swing freely between the plates. The lower end of pendulum 108 is provided with an index marking 110 similar in construction and function to inscribed line 16 described hereinabove. The upper end of pendulum 108 is provided with a transversly extending platform 111 which mounts a magnetic compass 112 on its upper surface. Compass 112 contains a freely rotatable indicator 113 having a magnatized tip 114. Compass 112 may be fixedly mounted to mounting platform 111, or may be provided with a rotatable bezel 115 around its outer periphery which contains a plurality of angular index markings, one of which is shown at 116. It will be understood that bezel 115 may be rotated to any position to provide a reference point from which azimuth angles may be measured. It will also be understood that the weight of the lower portion of pendulum 108 may be adjusted to offset the weight added by mounting platform 111 and compass 112 positioned thereon.

Either or both of side plates 105 may be made totally or partially transparent so that index marking 110 on pendulum 108 can be observed. Alternatively, side plate 105 may be fabricated from an opaque material, and an arcuate slot, shown alternatively at 117, may be provided in one or both of the plates. In addition, a plurality of spaced angular index markings, one of which is shown at 118, may be provided in a manner similar to that described hereinabove. It will be observed that this construction permits the angular elevation readings to be read from both sides of gage 100. In addition, the construction described in the embodiment of FIG. 9-FIG. 11 also insures that compass 112 will remain substantially horizontal regardless of the inclination of the gage to permit free rotational movement of the compass indicator 113.

In operation, the gage 100 may be mounted to the antenna in a manner similar to that described hereinabove in the embodiment of FIG. 1-FIG. 3 and may be used to establish the desired azimuthal and elevational positions of the dish antenna.

It will be understood that the mounting means for mounting the alignment gage of the present invention to the dish antenna will vary according to antenna size and style, but in any event, will be chosen so that the relationship between the alignment instrument and the antenna pointing axis is correct. Furthermore, it will be understood that the mounting position of the gage will be chosen so that the presence of iron or steel antenna components or masts do not affect the magnetic compass and create erroneous compass readings. Finally, it will be observed that the present invention provides means by which the azimuth and elevation position of the pointing axis of the antenna can be easily and readily observed while the installer is tightening the locking arrangement associated with the dish antenna.

It will be further understood the various changes in the details, steps, materials and arrangements of parts, which have been herein described in order to explain the nature of the invention, may be made by those skilled in the art within the principle and scope of the invention as expressed in the appended claims.

The embodiments of the invention in which an exclusive property or privilege is claimed are as follows:

1. In a receiving antenna structure having a dish antenna fixed in a predetermined position, the improvement in combination therewith comprising an alignment gage for establishing the correct azimuthal and elevational orientation of the pointing axis comprising the electrical boresight of the antenna including means for visually measuring the azimuthal position of the pointing axis including means for measuring the angular deviation in the horizontal plane from magnetic north, said azimuthal measuring means comprising a magnetic compass having a rotatably mounted partially magnetized movable indicator and a graduated angular scale surrounding said indicator; means for visually measuring the elevational position of the pointing axis including means for measuring angular deviation in the vertical plane from a true vertical axis, said elevational position measuring means comprising a graduated angular scale generally vertically disposed when the gage is mounted on the antenna, a pivotally mounted vertically hanging weighted pendulum having indicating means on one end thereof cooperating with said scale to display the vertical angular deviation, a plate like mounting bracket, means for pivotally mounting said pendulum to said bracket, said scale comprising a plurality of equally spaced indicia spaced equal distances from the pivot point on one surface of the bracket, and means for mounting said compass to said pendulum such that said movable indicator remains substantially horizontal with changes in inclination of the antenna; and means for temporarily and detachably mounting said gage to the antenna so that said azimuthal and elevational measuring means are readily visible to permit easy adjustment of the pointing axis to a predetermined desired position.

2. The apparatus according to claim 1 wherein said compass includes a rotatable bezel bearing said azimuthal scale.

3. The apparatus according to claim 1 wherein said bracket includes a substantially transparent portion adjacent said elevational scale, said pendulum indicating means being visible through said transparent portion.

4. The apparatus according to claim 3 wherein said transparent portion comprises an arcuate slot.

5. The apparatus according to claim 1 wherein said bracket comprises a pair of spaced plates disposed substantially vertically when the gage is mounted on the antenna and means for pivotally mounting said pendulum to at least one plate between said plates, said elevational scale being provided on at least of one of said plates.

6. The apparatus according to claim 5 wherein said bracket includes a substantially transparent portion adjacent said elevational scale, said pendulum indicating means being visible through said transparent portion.

7. The apparatus according to claim 6 wherein each of said plates includes said substantially transparent portion, said pendulum indicating means being visible through either of said plates.

8. The apparatus according to claim 6 wherein said transparent portion comprises an arcuate slot.

9. The apparatus according to claim 1 wherein said bracket comprises a pair of spaced plates disposed vertically when the gage is mounted on the antenna and means for pivotally mounting said pendulum to at least one plate between said plates, said elevational scale being provided on at least one of said plates, at least one of said plates having a substantially transparent portion.

* * * * *